United States Patent
Li et al.

(10) Patent No.: US 10,681,280 B2
(45) Date of Patent: Jun. 9, 2020

(54) CAMERA COMPONENT LOCATION INDICATOR ON DISPLAY

(71) Applicant: Lenovo (Singapore) Pte. Ltd., Singapore (SG)

(72) Inventors: Scott Wentao Li, Cary, NC (US); Robert James Kapinos, Durham, NC (US); Timothy Winthrop Kingsbury, Cary, NC (US); Russell Speight VanBlon, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/481,085

(22) Filed: Apr. 6, 2017

(65) Prior Publication Data

US 2018/0295287 A1 Oct. 11, 2018

(51) Int. Cl.
*H04N 5/232* (2006.01)

(52) U.S. Cl.
CPC ... *H04N 5/23293* (2013.01); *H04N 5/232945* (2018.08)

(58) Field of Classification Search
CPC .......... H04N 5/23293; H04N 5/232945; G06F 17/30424
See application file for complete search history.

(56) References Cited

U.S. PATENT DOCUMENTS

| | | | |
|---|---|---|---|
| 2002/0128908 A1* | 9/2002 | Levin | G06Q 30/02 705/14.53 |
| 2009/0201258 A1* | 8/2009 | Griffin | G06F 3/04886 345/173 |
| 2013/0002668 A1* | 1/2013 | Poston | G06T 19/003 345/420 |
| 2013/0003128 A1* | 1/2013 | Watanabe | G03B 35/08 358/1.15 |
| 2016/0330332 A1* | 11/2016 | Celik | H04M 15/852 |
| 2016/0359688 A1* | 12/2016 | Gao | H04L 41/22 |
| 2017/0180615 A1* | 6/2017 | Lautenbach | F21V 23/003 |

* cited by examiner

*Primary Examiner* — Antoinette T Spinks
(74) *Attorney, Agent, or Firm* — Ference & Associates LLC (57) ABSTRACT

One embodiment provides a method, including: determining, using a processor, a camera of an information handling device is active; identifying, using a processor, a location of an at least one lens of the camera on the information handling device; and providing, on a display screen of the information handling device, an indication of the location of the at least one lens of the camera. Other aspects are described and claimed.

21 Claims, 4 Drawing Sheets

CAMERA COMPONENT LOCATION INDICATOR ON DISPLAY

BACKGROUND

Many information handling devices ("devices"), for example smart phones, tablet devices, laptop computers, and the like, are capable of capturing image data using on device image capture devices. For example, a user can use an information handling device to capture still frame images, video, panoramic images, and the like, using the on-device camera or other image capture device. Due to device popularity and device portability capturing images has become ubiquitous in daily life.

BRIEF SUMMARY

In summary, one aspect provides a method, comprising: determining, using a processor, a camera of an information handling device is active; identifying, using a processor, a location of an at least one lens of the camera on the information handling device; and providing, on a display screen of the information handling device, an indication of the location of the at least one lens of the camera.

Another aspect provides an information handling device, comprising: a processor; a memory device that stores instructions executable by the processor to: determine, using a processor, a camera of an information handling device is active; identify, using a processor, a location of an at least one lens of the camera on the information handling device; and provide, on a display screen of the information handling device, an indication of the location of the at least one lens of the camera.

A further aspect provides a product, comprising: a storage device that stores code, the code being executable by a processor and comprising: code that determines a camera of an information handling device is active; code that identifies a location of an at least one lens of the camera on the information handling device; and code that provides, on a display screen of the information handling device, an indication of the location of the at least one lens of the camera.

Yet, a further aspect provides a method, comprising: determining, using a processor, a camera of an information handling device is active; identifying, using a processor, an orientation of the information handling device; and providing, on a display screen of the information handling device, an indication of the location of at least one lens of the camera based on the orientation of the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The ability to capture images (e.g., still frame pictures, videos, etc.) using portable devices with on-board image capture devices, for example, smart phones, tablets, handheld gaming devices, and the like, has provided users with greater versatility to capture daily events. For example, rather than needing a dedicated camera to capture images and events, a user can use his/her phone to capture the desired image. This ability has greatly increased the volume of images that are captured by users.

When a user operates an image capture device (e.g., camera, video recorder, etc.) integral to a device, the user is typically holding the device in his/her hand. The term "camera" will be used herein interchangeably with "image capture device" for ease of readability. The term lens will be used here throughout for ease of readability. However, it should be understood by one skilled in the art that the system as described herein can be applied to a system with more than one lens. One problem with using on-device cameras (i.e., cameras integral to an information handling device) is that each device typically has the different camera components (e.g., lens, view finder, flash, distance estimator, etc.) in particular locations. These locations are not universal between different device manufacturers, different device types, and the like. For example, one smart phone manufacturer may locate the view finder in the center top of the device, while another device manufacturer locates the view finder in the top corner of the device. As another example, a handheld gaming device manufactured by a device manufacturer may include the flash in the center of the top screen of the device, while a tablet manufactured by the same manufacturer may include the flash in the lower right corner of the device.

Often, the user of the device is trying to quickly capture a desired image. For example, the user may be attempting to capture an image in adverse weather conditions and is trying to capture the image as quickly as possible. As another example, the user may be attempting to capture the image while in a crowd and is trying to capture the image before the user cannot see the target object. As another example, the user may be just trying to capture a moment before it passes. Unfortunately, because the components of the camera may be in locations unknown by the user, the user may hold the device in a manner that obstructs the components of the device necessary for proper image data acquisition. As an example, the user may place a finger over the flash component which results in a dark or unrecognizable image. As another example, the user may place a palm over a distance sensor and the camera fails to correctly focus the image. The only way that a user can identify the location of the camera components is to flip the device over to see the physical location of the components. This can be time-consuming and the user may miss the desired image.

Accordingly, an embodiment provides a method for providing an indication of the location of components of a camera on a device. The indication can be provided for some or all of the components. For example, for a device having more than one camera lens, the system may provide an indication of the location of one, some, or all of the lenses, on the display device. An embodiment may determine that a camera of an information handling device is active or has been activated. For example, the system may receive indication that the camera software has been opened or activated. As another example, the system may receive user input indicating that the camera has been activated.

The system may identify a location of a lens or other camera components on the device. To identify the location of the lens or other camera component, the system may identify the specific device that is being used to capture the image. For example, the system may identify a particular make and model of the device. The system may then access a database that includes camera component locations. Based upon comparing the device to the database, the system may identify the location of the camera components. The system may also identify the camera components based upon a user input. For example, upon an initial start-up the system may request the user provide an indication of the camera component locations.

Once the system has identified the physical location of the camera components, the system may provide an indication of the location of the camera components on the display device of the device. For example, the system may highlight, on the display of the device, the corresponding location of the camera components. As another example, the system may display a graphic of the corresponding camera component in the corresponding location on the display. In this manner, a user has a visual indication of the location of the camera and its associated components such that the user does not block the lens and associated components when acquiring image data. With the user aware of these locations, the user may grasp the device in a manner that does not obstruct or partially occlude the camera lens and associated components. This prevents less than optimal images and video from being acquired and improves the user experience of the device.

The illustrated example embodiments will be best understood by reference to the figures. The following description is intended only by way of example, and simply illustrates certain example embodiments.

Figure 1:
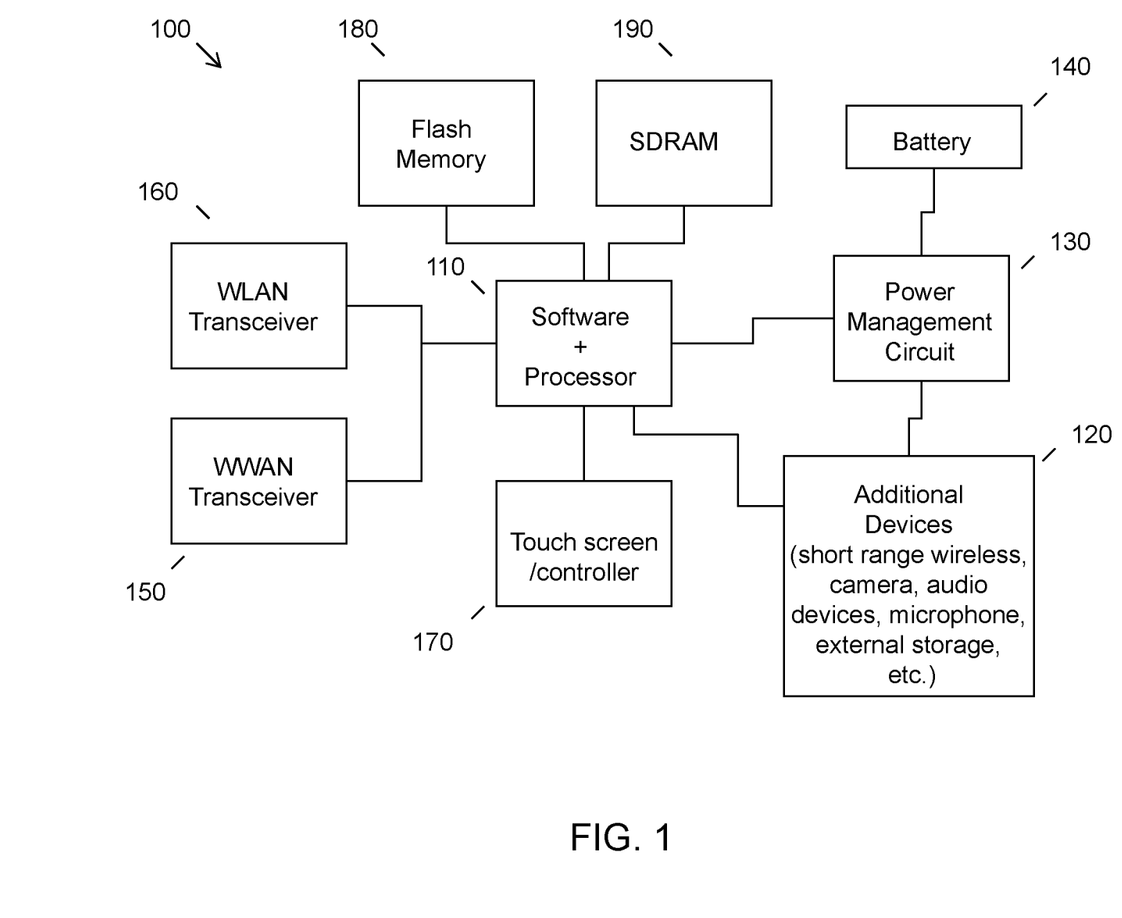
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
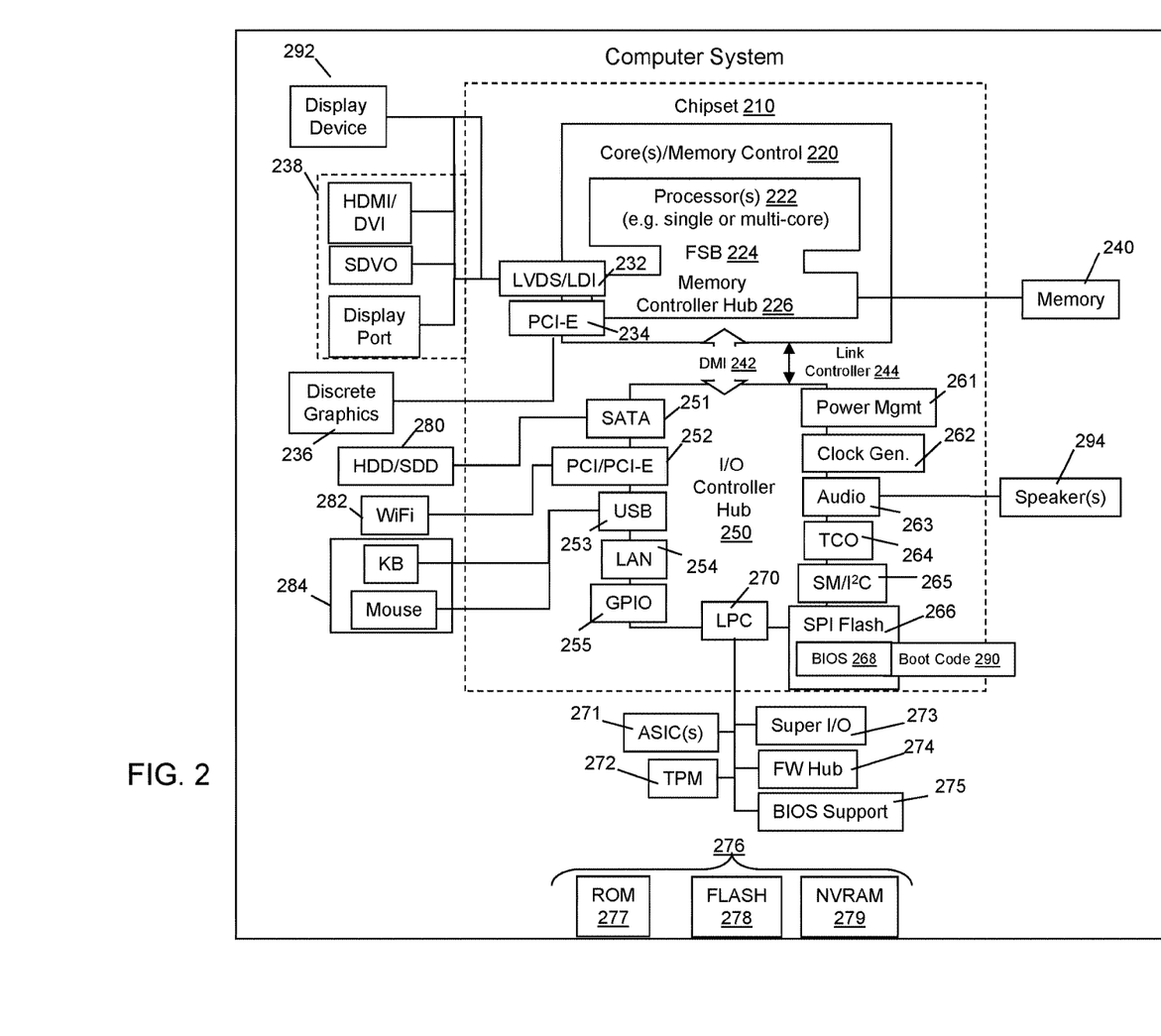
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to capture images. For example, the circuitry outlined in FIG. 1 may be implemented in a tablet or smart phone embodiment, whereas the circuitry outlined in FIG. 2 may be implemented in a personal computer embodiment.

Figure 3:
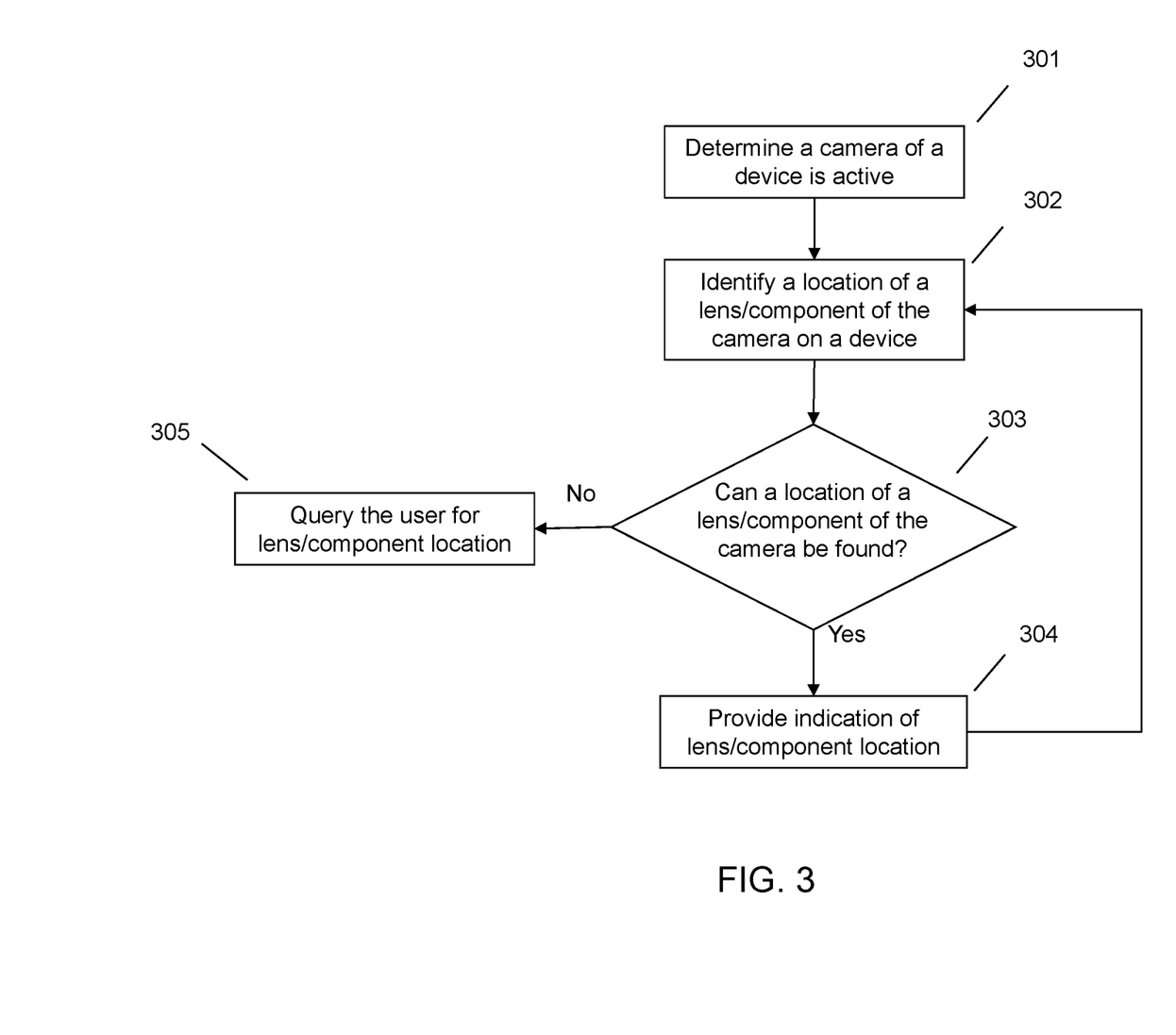
FIG. 3 illustrates an example method of providing an indicator of camera component locations on a display of an information handling device.

Referring now to FIG. 3, an embodiment may provide an indication of a location of camera components on a display of a device. At 301, an embodiment may determine a camera of a device is active. Determining the activation of the camera may be accomplished using a variety of techniques. An embodiment may determine the camera is active based upon an indication by the device. For example, when the camera is activated, the device may start an application or software associated with the camera. Thus, the opening of a camera application or software, either by the device automatically or by a user, may indicate that the camera is active. The activation of the camera may, additionally or alternatively, be user initiated. For example, the camera may be activated by the user clicking on the camera icon on a touchscreen, touching a camera button on the device, and the like.

Determining the camera is active may also be based upon a button associated with the camera being activated, for example, the user pushing or selecting the shutter button, the user pushing or selecting a camera mode (e.g., video, still image, close-up mode, activity mode, etc.), the user pushing or selecting a function associated with the camera (e.g., zoom, pan, tilt, focus adjustment, target area, etc.), and the like. Determining the camera is active may also be based upon a modification of a characteristic of the camera. For example, the system may determine that the camera, or a component of the camera, has been unblocked or uncovered. For example, the system may determine that a user has uncovered the view finder or lens of the camera.

At 302, an embodiment may identify a location of the camera lens on the device. Other embodiments also determine the location of components associated with the camera, for example, flash, rangefinder, microphone, light meter, viewfinder, and the like. To identify the location of the camera lens, or other camera component, an embodiment may query the chipset or similar hardware on the device for device information, for example, model type, manufacturer, serial number, and the like. In one embodiment, the device may query the user for device information.

The device information may then be compared to a database or other data storage repository (e.g., Internet, database, comparison chart, etc.). The data storage repository may be located locally on the device, remotely on a device accessible by the device (e.g., remote storage location, cloud storage, network storage, etc.) or the like. The data storage repository may include the device information and may also include the location of the camera components, for example, as x,y coordinates, relational positions (e.g., center top of device, bottom of device, top-left corner, etc.), locations in relation to other components (e.g., directly behind home button, 3 inches up from logo, etc.), and the like. An embodiment may compare the device information to the data storage repository and identify to determine the location of the camera components for the device.

Identifying the location of the camera components may also be accomplished by querying the user. For example, upon power on or during set-up of the device, the system may request the user indicate, on the display device, the location of the components. The system may then store these locations and identify relationships between the location of the component and other components to determine the location of the camera components. The identification of relational positions may assist in identifying the location of the camera components even with the device orientation is different. For example, if the user or system identifies the location of the camera components when the device is in an upright position, the location of the camera components changes with respect to the world if the device is turned to a sideways position. Accordingly, the use of relational positions may assist in identifying the location of the camera components at all times.

Alternatively, the system may identify the location of the camera components and also note the position and/or orientation of the device. As the device is repositioned or reoriented, the device may capture positional information from a position sensor, to determine the new location of the camera components. For example, if the device is positioned in an upright position and the system identifies the location of the flash as in the upper-right corner, when the device is turned 90 degrees, the system may identify this new position and then calculate or compute the new position of the camera component in relation to the new orientation.

As an alternatively example, rather than determining the exact location of the camera components, the system may merely identify the position and/or orientation of the device. For example, if the camera software includes the camera component indication, the system may not have to identify specifics of the device to determine the location of the lens. Rather, the camera software may be specifically designed for the particular device. In this case, the system may merely identify the position and/or orientation of the device in order to determine where the lens or other camera component is location. For example, the system may merely choose an overlay from the camera software to provide an indication of the location camera component, where the overlay is chosen based on the orientation of the device.

At 303, an embodiment may determine if a camera lens, or other camera component, location has been identified. The location of the camera lens, or other camera components, for common device types will likely be discoverable as previously discussed. However, some device models (i.e. older device types or uncommon devices) may not be discoverable, and the camera lens location for that device not found. Alternatively, the system may be able to identify the location of some camera components, but not all camera components. For example, the system may be able to identify the location of the viewfinder and flash, but not the rangefinder. If the location of the camera lens or other component cannot be identified, the system may query the user at 305.

For example, if the device type and associated camera lens location cannot be discovered, the user may manually input the x, y coordinates, relational position, or the like, of the camera lens or other camera components into the device for future use. The embodiment allows the user to measure the distance of the camera lens from two edges of the device, compensating for the frame around the screen. The precision of the user's measurement may then be checked by blocking the camera lens to see if the measured lens location is co-localized with the expected lens location. For example, the system may request the user place a finger or other blocking object at the expected position of the camera component. Alternatively, an embodiment may take no further action.

Figure 4A:
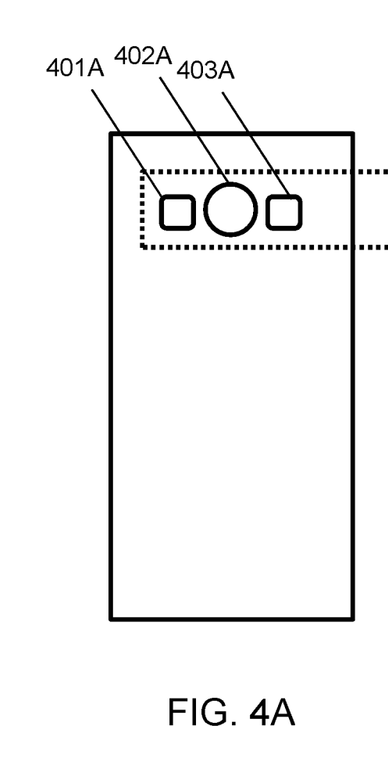
FIG. 4A illustrates an example embodiment of the back of a non-limiting example device with camera lens and associated components.
Figure 4B:
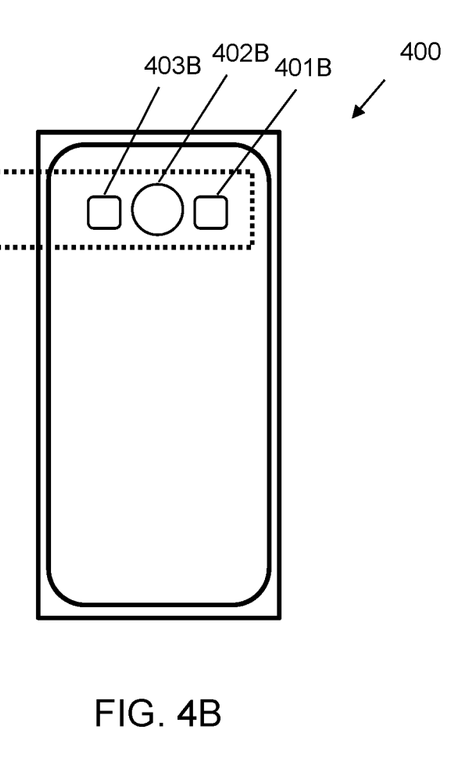
FIG. 4B illustrates an example embodiment of the front of a non-limiting example device with indicator of camera lens and associated components on the screen.

If, however, the location of the lens, or other component, can be determined at 303, an embodiment may provide an indication of the lens location at 304, on the display of the device. For example, the indication may be an outline of the lens, or other camera component, location visible on the display opposite the camera location on the back of the device. As another example, when the camera software is activated the system may highlight the location of the camera lens or other camera locations. For example, referring to FIGS. 4A-4B. FIG. 4A illustrates the back of a device 400 and different camera components, a rangefinder 401A, lens 402A, and flash 403A. After identifying the location of the components, the system may provide an indication on the display of the front side of the device, FIG. 4B, that illustrates the relative location of the components, flash indication 403B, lens indication 402B, and rangefinder indication 401B. In one embodiment, the system may only provide an indication of the camera lens and/or component location when the camera is activated. Thus, if the user is not using the camera, the display will not be cluttered with indications of the camera component locations. After providing an indication of one or more camera components, the system may return to 302 to identify locations of one or more additional camera components.

In one embodiment, the system may identify when a camera component is blocked. For example, the indication may be an audible alarm or voice message that indicates the lens/component is blocked. The indication may be a vibration or haptic feedback to alert the user of lens/component blockage. The indication may also be text or a symbol that appears on the screen to warn the user that the lens/component is blocked. The indication may allow the user to proceed to acquire image data with a lens obstruction, or may instruct the user to move the obstruction before the device will acquire image data. If the camera lens position cannot be co-localized with a screen location (e.g., a slide out phone device in which the back of the device and screen move in opposite directions for use), an indicator may be displayed in which an arrow denotes the location of the camera lens/component on the screen so the user does not obstruct the camera lens which lies in line in the direction of the arrow.

One embodiment may use capacitive sensing to detect an obstructed camera lens or camera component. The capacitive sensing uses technology similar to touch screen capacitive sensing, but relies on a relatively small area of capacitive sensing material placed around the perimeter of the lens or camera component such that either touching or objects in close proximity will be detected by the capacitive sensing, thus alerting the device of obstruction. The capacitive sensing may also be used to determine the location of the camera lens/component. For example, the system may determine that the lens/component is being blocked and may determine the relational position of the lens/camera and store this information for future use. As another example, the user may be requested to block a particular component and the system can determine the relational position of the component based upon the location of the capacitive sensing.

The various embodiments described herein thus represent a technical improvement to the traditional method of capturing image data using a device. Using the techniques described herein, the device provides a notification to the user of camera lens/component position, without requiring the user to turn the device over to find the location of the lens/component before capturing the desired image. This allows the user to use the device in a manner that does not obstruct the camera lens or camera components. This improves the user experience when capturing image data using the device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   determining, using a processor, a camera of an information handling device is active;
   identifying, using a processor, a location of at least one lens of the camera on the information handling device, wherein the identifying comprises identifying a location of a component of the information handling device and determining a position of the at least one lens of the camera in relation to the identified location of the component, wherein the identifying is based upon a data storage repository, wherein the data storage repository comprises relational positions of at least one component of the information handling device and the relational positions are, at least in part, based upon an identified model of the information handling device having component positions stored in the data storage repository; and
   providing, on a display screen of the identified model of the information handling device, an indication of the location of the at least one lens of the camera, wherein the indication is provided at least while receiving a user-provided input to capture an image.

2. The method of claim 1, wherein the identifying comprises identifying a type associated with the information handling device.

3. The method of claim 2, wherein the identifying further comprises comparing the type of information handling device to a database of information handling devices.

4. The method of claim 1, further comprising determining the at least one lens of the camera is obstructed.

5. The method of claim 4, further comprising providing a notification indicating the at least one lens of the camera is obstructed.

6. The method of claim 4, wherein the determining comprises using capacitive sensing.

7. The method of claim 1, further comprising identifying a location of components associated with the camera.

8. The method of claim 7, further comprising providing an indication of the location of the components.

9. The method of claim 1, wherein the identifying comprises receiving position sensor data associated with an orientation of the information handling device.

10. The method of claim 1, wherein the identifying comprises receiving a user input indicating the location of the at least one lens.

11. An information handling device, comprising:
    a processor;
    a memory device that stores instructions executable by the processor to:
    determine, using a processor, a camera of an information handling device is active;
    identify, using a processor, a location of at least one lens of the camera on the information handling device, wherein the identifying comprises identifying a location of a component of the information handling device and determining a position of the at least one lens of the camera in relation to the identified location of the component, wherein the identifying is based upon a data storage repository, wherein the data storage repository comprises relational positions of at least one component of the information handling device and the relational positions are, at least in part, based upon an identified model of the information handling device having component positions stored in the data storage repository; and
    provide, on a display screen of the identified model of the information handling device, an indication of the location of the at least one lens of the camera, wherein the indication is provided at least while receiving a user-provided input to capture an image.

12. The information handling device of claim 11, wherein the instructions executable by the processor to identify comprise instructions to identify a type associated with the information handling device.

13. The information handling device of claim 12, wherein the instructions executable by the processor are further executable by the processor to compare the type of information handling device to a database of information handling devices.

14. The information handling device of claim 11, wherein the instructions executable by the processor are further executable by the processor to determine the at least one lens of the camera is obstructed.

15. The information handling device of claim 14, wherein the instructions executable by the processor are further executable by the processor to provide a notification indicating the at least one lens of the camera is obstructed.

16. The information handling device of claim 14, wherein the instructions executable by the processor to determine comprise instructions to determine using capacitive sensing.

17. The information handling device of claim 11, wherein the instructions executable by the processor are further executable by the processor to identify a location of components associated with the camera and to provide an indication of the location of the components.

18. The information handling device of claim 11, wherein the instructions executable by the processor to identify comprise instructions to receive position sensor data associated with an orientation of the information handling device.

19. The method of claim 11, wherein the instructions executable by the processor to identify comprise instructions to receive a user input indicating the location of the at least one lens.

20. A product, comprising:
   a storage device that stores code, the code being executable by a processor and comprising:
   code that determines a camera of an information handling device is active;
   code that identifies a location of at least one lens of the camera on the information handling device, wherein the identifying comprises identifying a location of a component of the information handling device and determining a position of the at least one lens of the camera in relation to the identified location of the component, wherein the identifying is based upon a data storage repository, wherein the data storage repository comprises relational positions of at least one component of the information handling device and the relational positions are, at least in part, based upon an identified model of the information handling device having component positions stored in the data storage repository; and
   code that provides, on a display screen of the identified model of the information handling device, an indication of the location of the at least one lens of the camera, wherein the indication is provided at least while receiving a user-provided input to capture an image.

21. A method, comprising:
   determining, using a processor, a camera of an information handling device is active;
   identifying, using a processor, an orientation of the information handling device, wherein the identifying is based upon a data storage repository, wherein the data storage repository comprises relational positions of at least one component of the information handling device and the relational positions are, at least in part, based upon an identified model of the information handling device having component positions stored in the data storage repository; and
   providing, on a display screen of the identified model of the information handling device, an indication of the location of at least one lens of the camera identified based upon a relational position of the at least one lens of the camera based on the orientation of the information handling device, wherein the indication is provided at least while receiving a user-provided input to capture an image.

* * * * *